June 22, 1965 O. THOMA 3,190,231
HYDRAULIC APPARATUS
Filed Jan. 31, 1963 2 Sheets-Sheet 1

INVENTOR
OSWALD THOMA
BY
Reynolds & Christensen
ATTORNEYS

June 22, 1965     O. THOMA     3,190,231
HYDRAULIC APPARATUS

Filed Jan. 31, 1963     2 Sheets-Sheet 2

INVENTOR
OSWALD THOMA
BY
Reynolds + Christensen
ATTORNEYS

United States Patent Office 3,190,231
Patented June 22, 1965

3,190,231
HYDRAULIC APPARATUS
Oswald Thoma, Charlton Kings, Cheltenham, England, assignor to Dowty Hydraulic Units Limited, Ashchurch, England, a company of Great Britain, and Unipat A.G., Glarus, Switzerland, a company of Switzerland
Filed Jan. 31, 1963, Ser. No. 255,254
Claims priority, application Great Britain, Apr. 6, 1962, 13,366/62
2 Claims. (Cl. 103—162)

This invention relates to hyraulic apparatus and more particularly to rotary bearings fed with liquid at pressure to support a load.

It is known in a rotary bearing, whether it be arranged to resist axial thrust or radial thrust, to provide two members capable of relative rotation and having surfaces which fit closely to one another during relative rotation, there being in one of the members at least one recess adapted to be fed with hydraulic liquid at pressure through a restrictor. Leakage flow from the recess between the surfaces will then cause a pressure drop at the restrictor which depends on the leakage flow rate and in turn depends on the clearance between the surfaces. The load exerted between the two members is opposed by hydraulic pressure in the recess and the pressure of leakage liquid between the surfaces and the clearance between the surfaces will adjust itself to the condition that the total hydraulic force generated between the surfaces by the hydraulic pressure will exactly balance the load. Such known rotary bearings have a major disadvantage in that the restrictor for feeding the recess is normally of quite small dimensions and is easily blocked by small particles of solid matter in the hydraulic liquid. When blockage occurs the two surfaces will make contact with one another and the bearing will fail in a short time. Another disadavntage of such bearings is that during normal operation there is a substantial demand for hydraulic pressure liquid to maintain adequate pressure in the recess, which represents lost energy and therefore reduces efficiency of the apparatus incorporating the bearing.

The main object of the present invention is to provide a rotary bearing having a recess fed with hydraulic pressure through a restrictor in which the possibility of blockage of the restrictor is reduced compared with bearings of the known type. A secondary object of the present invention is to reduce the flow rate of hydraulic liquid at pressure required for successful operation of a rotary bearing when compared with bearings of the known type.

In accordance with the present invention a rotary bearing comprises two members capable of relative rotation and having surfaces which fit closely to one another during relative rotation, there being in one of the members at least one hydrostatic balancing means comprising a hydrostatic balancing recess opening into the surface of that member and a sole restricting connection which alone leads pressure fluid to the recess, the recess during rotation being substantially continuously closed by the other member apart from a leakage gap formed by slight clearance between the surfaces, and there being a supply means for intermittent supply of liquid under pressure to the restrictor, and thence to the recess during the rotation. In this way liquid under pressure reaches the recess at a lower pressure than that supplied to the flow restricting connection because of pressure loss in the flow restricting connection, but the metering effect of the intermittent supply of liquid enables the restricting connection to have a larger cross sectional dimension than in the known type of bearing, thereby reducing the possibility of blockage.

A plurality of hydrostatic balancing means may be placed in either one or both of the surfaces, each balancing means being individually self balancing.

The invention may be applied to two relatively rotatable members between which other thrust exerting means is capable of operation, the invention then serving to provide an accurately self adjusting part of the total thrust exerted between the two members to resist a thrust tending to close the two surfaces together.

The flow restricting connection for a recess may comprise a groove extending to the recess in the surface which contains the recess. An intermittent supply of liquid under pressure may conveniently be obtained by providing ports in the two surfaces which coincide with one another intermittently during rotation and provide an intermittent connection from a source of hydraulic pressure to the restricting connection.

This invention is particularly useful as an axial thrust bearing to support a rotary cylinder block on a flat fixed valve surface in a pump or motor, although it is not confined to use in that arrangement. The fixed valve surface may include supply and return ports which co-operate with cylinder ports extending from a valve surface formed on the cylinder block. The supply and/or return ports, depending on the pressure of liquid available in them, will exert a hydraulic thrust on the flat valve surface of the cylinder block which is less than the total thrust acting to hold the block on the fixed valve surface, the hydrostatic balancing means of the present invention being used to provide a self adjusting hydraulic thrust which together with the thrust exerted hydraulically at the supply and/or return ports is sufficient to balance accurately the total thrust holding the block on the fixed valve surface. Preferably at least one hydrostatic balancing means is provided for the supply port and at least one hydrostatic balancing means is provided for the return port, the flow restricting connection of which hydrostatic balancing means being adapted to be fed intermittently by rotation of the cylinder block from its associated supply or return port.

One embodiment of the invention employed in an axial cylinder pump having a rotary cylinder block will now be described with reference to the accompanying drawings in which.

Figure 1:
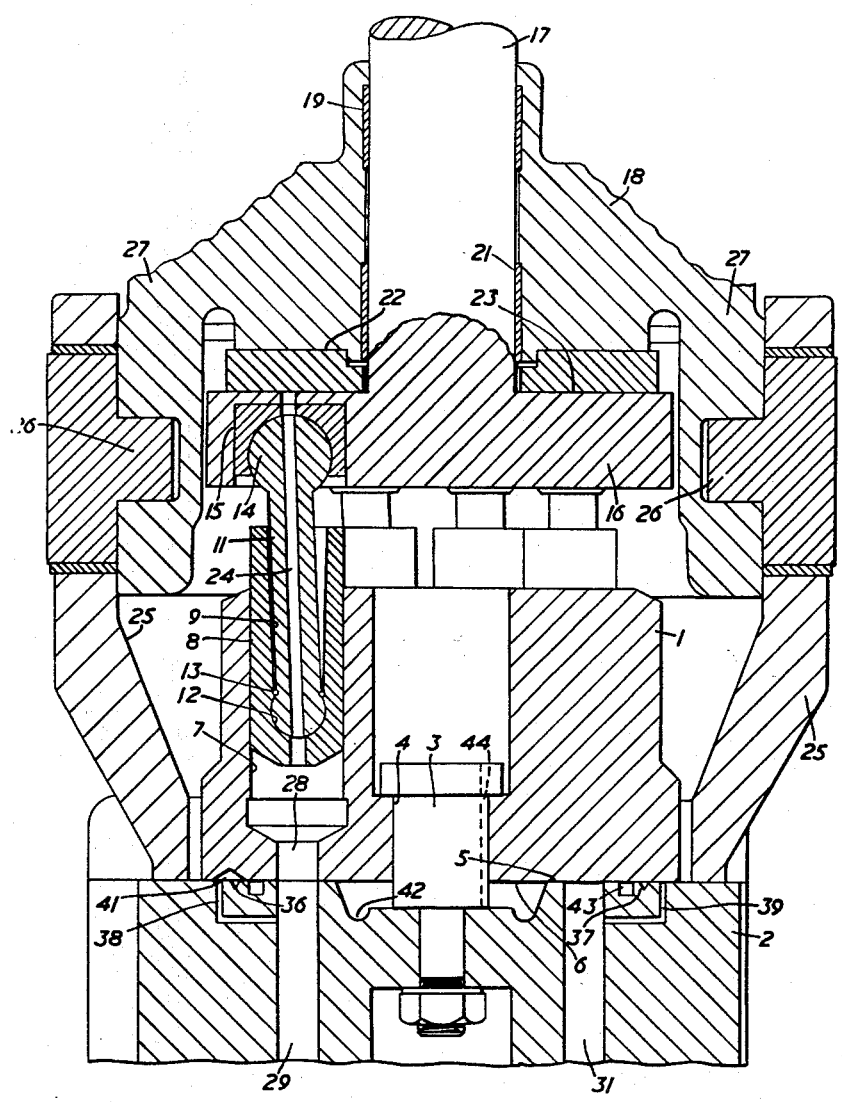
FIGURE 1 is a section along the axis of the pump.

Referring initially to FIGURE 1 a rotary cylinder block 1 is provided mounted for rotation upon a valve plate 2 by means of a central spigot 3 secured to the valve plate 2 and extending into a bore 4 in the cylinder block. The valve plate 2 has a valve surface 5 which appears in elevation in FIGURE 2 whilst the cylinder block has a co-operating surface 6 fitting closely against the valve surface 5. The surfaces 5 and 6 are both plane and are located at right angles to the axis of rotation at the cylinder block 1.

Within the cylinder block 1 a plurality of cylinders 7 are provided evenly spaced around the rotation axis and having their axes parallel to the rotation axis. In each cylinder a piston 8 is provided for reciprocating movement therein. The pistons 8 extend from the open ends of the cylinders 7 remote from the valve surface 6. Each piston includes an internal bore 9 within which a connecting rod 11 is located. Each connecting rod engages its piston for transmission of thrust at a spherical surface 12. The connecting rod is retained within the piston by means of a circlip 13 engaging in co-operating grooves within the connecting rod and the bore 9. The connecting rod 11 extends from the piston and at its opposite end terminates in a ball 14. Each ball 14 is located within a pressure pad 15, all pads being fitted in regularly spaced arrangement around a drive flange 16 which faces the end of cylinder block 1 remote from the valve surface 6. The drive flange 16 is carried by an integrally formed drive shaft 17 mounted for rotation in a bearing housing 18 having sleeve bearings 19 and 21. An axial thrust bearing for the drive flange 16 is formed by a wear plate 22 located within the bearing housing 18 and engaging the surface 23 of the drive flange 16. For lubrication of the surface 23 of the drive flange where it bears against the wear plate 22, passages 24 are provided extending one through each connecting rod from the cylinders 7 to the surface 23. These passages will carry liquid at pressure from the cylinders.

Figure 2:
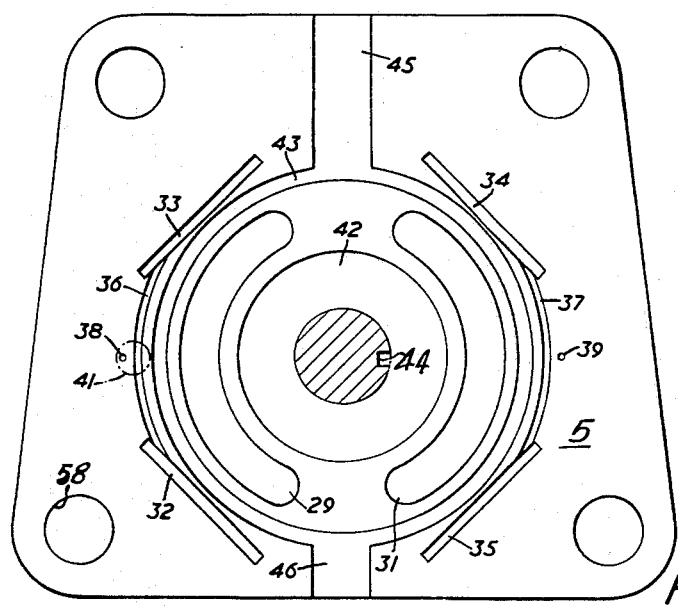
FIGURE 2 is an elevation of the valve surface forming the bearing surface on which the cylinder block is adapted to rotate and FIGURE 3 is an elevation of a modified form of the valve surface of FIGURE 2.

The cylinder block 1 and valve plate 2 are mounted by means of a pair of arms 25 which engage by means of trunnions 26 in lugs 27 extending from the bearing housing 18. The arms 25 are secured to the valve plate 2 by means of bolts extending through bolt holes 58 (FIGURE 2). The cylinder block 1, the valve plate 2, and the arms 25 form a tilting head tiltable relatively to the drive flange 16 about the axis of the trunnions 26. The axis of the trunnions 26 is arranged to pass through the drive flange 16 as a diameter of the circle through the centres of the ball joints 14.

As shown in FIGURE 1 the tilting head is so positioned about the trunnion axis that the axes of the drive flange 16 and the cylinder block 1 coincide. Rotation of the drive shaft 17 will cause rotation of drive flange 16 and of the ball joints 14. Movement of the ball joints 14 will cause connecting rods 11 to engage the sides of the bores 9 in the pistons to cause the cylinder block 1 to rotate synchronously with the drive flange 16. With the tilting head in the position shown in FIGURE 1 such rotation will not cause reciprocation of pistons within their cylinders and the pump is said to have zero displacement. By moving the tilting head about the trunnion axis to cause inclination between the drive shaft axis and the cylinder block axis it will be seen that rotation of the drive shaft axis will then cause reciprocation of pistons within their cylinders.

For the purpose of feeding liquid to and from the cylinders so that pump operation may be obtained, each cylinder 7 is provided with a port 28 opening into the surface 6 of the block. Each port 28 co-operates during rotation of the cylinder block with fixed ports 29 and 31 when open into the valve surface 5. These ports 29 and 31 are of kidney shape. During outward movement of each piston from its cylinder the associated cylinder port 28 will coincide with one of the kidney shaped ports 29 or 31 and during inward movement of a piston 8 the associated port 28 will coincide with the other of the kidney shaped ports 29 or 31. The ports 29 and 31 may be made suction and delivery ports respectively depending on the direction of rotation of the drive shaft 17 and the direction of movement of the tilting head from the zero displacement position. The ports 29 and 31 may be made delivery and suction ports respectively either by altering the direction of rotation of the drive shaft 17 or by moving the tilting head 25 onto the opposite side of the zero displacement position. Hydraulic connections to the ports 29 and 31 may be effected either by flexible pipes or by means of pipes having swivelling couplings to accommodate movement of the tilting head.

In describing operation of the pump it will be assumed that the port 29 is the delivery port and that it will contain liquid at a considerable pressure. During operation of the pump the cylinders 7 in connection with the port 29 will contain liquid at pressure and for the generation of this pressure the pistons 8 will exert a corresponding thrust. This thrust is a force which tends to urge the cylinder block 1 onto the valve surface 5. However, the existence of pressure in the port 29 will act in the opposite direction on the cylinder block 1 with a result that the force which actually urges the cylinder block onto the surface 6 is the product of the hydraulic pressure and the difference in effective areas of the port 29 and the pistons in connection with it. The design of the pump is such that the total piston area in connection with the port 29 is always larger than the area of the port 29 thus ensuring that there is always a force tending to hold the cylinder block on the valve surface 5. To ensure that metal to metal contact does not occur between the surfaces 5 and 6 as a result of the force holding the cylinder block 1 onto the surface 5 there is provided in accordance with the present invention in the valve surface 5 four rectangularly shaped closed balancing recesses 32, 33, 34, and 35. These recesses are so positioned that they are closed substantially by the peripheral portion of the surface 6 of the cylinder block 1. For the purpose of feeding hydraulic pressure to these recesses a pair of grooves 36 and 37 are cut in the surface 5, the groove 36 extending between recesses 32 and 33 and the groove 37 extending between recesses 34 and 35. Adjacent to each groove 36 and 37 at the centre thereof feed ports 38 and 39 are provided. These ports are connected by passage ways within the valve plate 2 to the adjacent ports 29 and 31. The cylinder block contains in the surface 6 at least one dimple 41 whose radial position is such that it is capable during rotation of bridging each feed port 38 or 39 with the adjacent groove 36 or 37. Within FIGURE 2 a dimple 41 is shown in dotted lines in a position to bridge between the port 38 and the groove 36. During rotation of the cylinder block 1 when pumping is being effected liquid pressure from the pressure port 29 will have access to the port 38 in valve surface 5, and on each occasion that a dimple 41 occupies the position shown in FIGURE 2 liquid at pressure will pass from the port 38 into the groove 36. Within the groove 36 the liquid will divide and flow in opposite directions toward the two recesses 32 and 33. It will be seen that in effect each of the grooves 36 and 37 comprises two restricted connections arranged in end to end relation for the reception of liquid at pressure from a dimple 41. Each such restricted connection constitutes the sole source of pressure liquid for a balancing recess. During flow of the liquid along the groove 36 it will lose pressure to an extent depending on the actual flow rate and within the recesses 32 and 33 hydraulic pressures will be established which are lower than the pressure existing in the port 29 by an amount which depends on the leakage rate of liquid from the recesses 32 and 33. By virtue of the fact that feed of pressure liquid through the groove 36 is intermittent it will be seen that this groove may have a larger effective cross section to obtain the same hydrostatic balancing effect as could be obtained if groove 36 were permanently connected to the pressure port 29. This clearly reduces the possibility of blockage of groove 36 by any solid matter contained in the hydraulic liquid. The intermittent feed of hydraulic liquid from the dimples 41 to the groove 36 requires a smaller overall flow rate of liquid to the recesses 32 and 33 than is the case if the groove 36 were connected directly to the port 29, the groove 36 in such a case, of course, being of smaller dimensions to obtain equivalent balancing effect. The reason for this occurrence is not entirely understood but it is thought to result from the fact that intermittent feeding of hydraulic pressure imposes a vibratory character to the pressure in the recesses 32 and 33. Each of the four recesses is substantially independent of the other recesses, each has its sole source of pressure liquid, and each will exert a balancing force which depends on the local clearance between the surfaces 5 and 6.

Leakage of liquid will occur from the pressure port 29 between the surfaces 5 and 6 giving a spread of hydraulic pressure from this port. In order to control such pressure spread a central circular recess 42 and an outer annular recess 43 are provided in the surface 5, both of these recesses being connected to a low pressure zone. Leakage liquid from the port 29 then flows to the recesses 42 and 43 and the areas over which pressure of leakage liquid may act on the cylinder block 1 thereby limited to the lands of the surface 5 formed between the port 29 and the recesses 42 and 43. The recess 42 is vented through a slot 44 cut along the side of the axle 3, the leakage liquid then being able to escape into a casing which encloses the pump. The outer recess 43 connects to a pair of radially directed recesses 45 and 46 in the surface 5 which extend beyond the periphery of the block surface 6 and thus connect into the casing in which the pump is located. Such casing will, of course, be at substantially zero pressure and may, in fact, form the reservoir from which hydraulic liquid is supplied to the port 29 or 31 at suction. The provision of the recesses 45 and 46 has a special significance in that during rotation of the cylinder block the dimples 41 will pass over these recesses whereby the dimples are vented of any pressure liquid that might remain in them and are thereby flushed to remove any solid matter which they might have picked up during rotation.

Whilst the rotary bearing of the invention has been particularly described with reference to a flat valve plate of an axial piston pump it will be appreciated that the invention is not necessarily so limited and may be applied to any members having surfaces which fit closely to one another during relative rotation. For example such surfaces might be of a spherical or conical shape and might be used for resisting an end thrust developed by any mechanism or apparatus.

Figure 3:
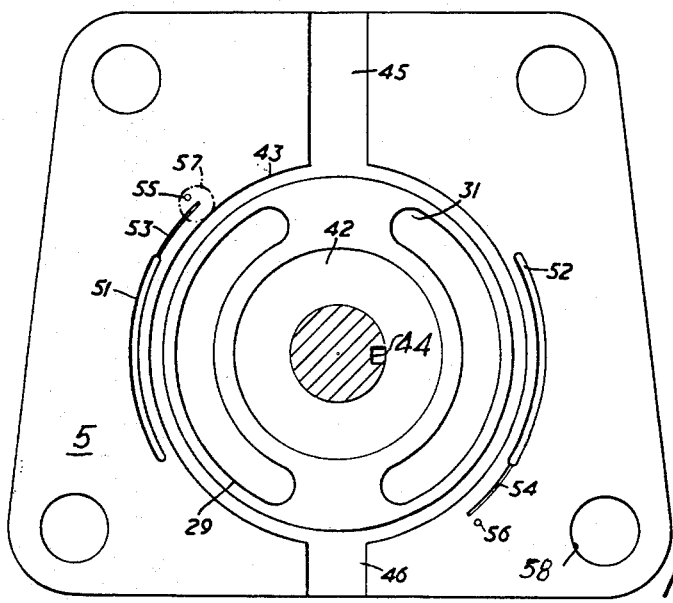

FIGURE 3 shows a modified form of the valve plate of FIGURE 2. This valve plate contains ports 29 and 31 and recesses 42, 43, 45 and 46 as described with reference to FIGURE 2. The difference from the form of FIGURE 2 lies in that only two balancing recesses 51 and 52 are provided formed in the valve surface adjacent to the ports 29 and 31 respectively. Pressure liquid is fed to recess 51 through a restrictor groove 53 in the valve surface. Pressure liquid is fed to recess 52 through a restrictor 54 in the valve surface. Adjacent the free end of restrictor 53 a pressure port 55 is formed in the valve surface being connected to port 29. Adjacent to the free end of restrictor 54 a pressure port 56 is formed in the valve surface being connected to port 31. One or more dimples 57 may be provided in the block surface 6 which during block rotation bridge intermittently between port 55 and groove 53 and between port 56 and groove 54 to supply pressure liquid which flows to the recesses 51 and 52 to exert balancing action in accordance with the clearance between the surfaces 5 and 6 as described with reference to FIGURE 2.

I claim as my invention:

1. In a rotary pump or the like, in combination, a valve plate and a cylinder block rotatable relative to the valve plate and having cylinders disposed about its axis, the complemental surfaces of the cylinder block and valve plate being arranged to transmit thrust but to afford but slight clearance between them, such surface of the valve plate having a hydrostatic balancing recess opening into it, and with a sole restricting connection leading to the recess, a separate feed port also opening into such surface adjacent the restricting connection, two kidney-shaped ports in such surface arranged to register during a rotative cycle with the cylinders of the cylinder block for intake and discharge, respectively, of fluid between the valve plate and cylinder block, said restricting connection being located concentrically of but radially outwardly of said kidney-shaped ports, an annular recess in the valve's surface concentric with and located intermediate said ports and the restricting connection, a central circular recess in the valve's surface located radially inwardly of the ports, the annular recess and the circular recess both being in communication with a low pressure region, the rotative cylinder block being formed in its surface that is complemental to the valve plate's surface so as to close the balancing recess and the restricting connection during the greater part of its rotative cycle, apart from a leakage gap resulting from the slight clearance, and the cylinder block's surface also having a bridging recess located to afford communication with both said feed port and said restricting connection momentarily during each rotative cycle, for access of pressure liquid intermittently from the feed port to the restricting connection, and thence to the balancing recess.

2. A rotary bearing as in claim 1, wherein a passage in the valve plate's surface directed transversely of the rotary path of the bridging recess of the cylinder block affords communication between the annular recess in the valve plate's surface and a low pressure region.

References Cited by the Examiner

UNITED STATES PATENTS

| | | | |
|---|---|---|---|
| 2,155,455 | 4/39 | Thoma | 103—162 |
| 2,916,334 | 12/59 | Thoma | 308—170 |
| 2,972,962 | 2/61 | Douglas | 103—162 |
| 2,977,891 | 4/61 | Bishop | 103—162 X |

LAURENCE V. EFNER, *Primary Examiner.*